US012341939B2

(12) United States Patent
Sato (10) Patent No.: US 12,341,939 B2
(45) Date of Patent: Jun. 24, 2025

(54) PRINTING SYSTEM, PRINTING APPARATUS, AND PRINTHEAD (71) Applicant: CANON KABUSHIKI KAISHA, Tokyo (JP)

(72) Inventor: Yuma Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 18/079,341

(22) Filed: Dec. 12, 2022

(65) Prior Publication Data
US 2023/0188661 A1 Jun. 15, 2023

(30) Foreign Application Priority Data
Dec. 13, 2021 (JP) .................. 2021-201989

(51) Int. Cl.
H04N 1/32 (2006.01)
H04N 1/00 (2006.01)

(52) U.S. Cl.
CPC ....... *H04N 1/32651* (2013.01); *H04N 1/0083* (2013.01); *H04N 1/00933* (2013.01); *H04N 1/32128* (2013.01); *H04N 2201/0036* (2013.01)

(58) Field of Classification Search
CPC ............................................ H04N 2201/0036
See application file for complete search history.

(56) References Cited

U.S. PATENT DOCUMENTS

| 2007/0002087 A1* | 1/2007 | Matsui | B41J 2/17546 347/9 |
| 2011/0304664 A1* | 12/2011 | Kubo | B41J 2/17553 347/12 |
| 2016/0167378 A1* | 6/2016 | Kimura | B41J 2/04586 347/10 |

FOREIGN PATENT DOCUMENTS

JP 2014-156032 A 8/2014

* cited by examiner

*Primary Examiner* — Shelby L Fidler
(74) *Attorney, Agent, or Firm* — Venable LLP (57) ABSTRACT A system includes a printing apparatus, and a printhead including a printing element. The printing apparatus includes a data transmission unit configured to transmit, to the printhead, a clock signal of a predetermined period and a data signal. The printhead includes a reception unit configured to receive the clock signal and the data signal, and an information transmission unit configured to transmit, to the printing apparatus, information concerning a reception result of the reception unit. When the data transmission unit transmits control data of the printing element as the data signal, a first period is set as the predetermined period. When the data transmission unit transmits, as the data signal, connection confirmation data for confirming connection of the printhead to the printing apparatus, a second period longer than the first period is set as the predetermined period.

7 Claims, 7 Drawing Sheets

PRINTING SYSTEM, PRINTING APPARATUS, AND PRINTHEAD

BACKGROUND OF THE INVENTION

Field of the Invention

The present invention relates to a printing system.

Description of the Related Art

There is known a printing apparatus that prints an image by discharging ink to a print medium. In a printing apparatus from which a printhead for discharging ink is detachable, a contact failure of an electrical contact between the printhead and the printing apparatus (apparatus main body) may occur when attaching the printhead. A contact failure occurs when, for example, small dust is sandwiched between the contact on the printhead side and that on the printing apparatus side. If a contact failure occurs, control data for driving a printing element, which is transmitted from the printing apparatus to the printhead is not received appropriately. To cope with this, there is proposed a printing apparatus including a function of inspecting a connection failure (for example, Japanese Patent Laid-Open No. 2014-156032).

As data transmission of control data transmitted from the printing apparatus to the printhead, high-frequency data transmission is performed to improve the printing speed. For example, differential signal (LVDS) method advantageous in increasing the speed is used. When inspecting a contact failure of a contact on a signal line of data transmission, erroneous determination may occur due to the influence of a time constant caused by a circuit incorporated in the printhead, along with an increase in frequency of a signal.

SUMMARY OF THE INVENTION

The present invention provides a technique capable of improving the inspection accuracy concerning a connection failure of a printhead.

According to an aspect of the present invention, there is provided a printing system comprising: a printing apparatus; and a printhead including a printing element and configured to be detachable from the printing apparatus, the printing apparatus including a data transmission unit configured to transmit, to the printhead, a clock signal of a predetermined period and a data signal synchronized with the clock signal, and the printhead including a reception unit configured to receive the clock signal and the data signal, and an information transmission unit configured to transmit, to the printing apparatus, information concerning a reception result of the reception unit, wherein when the data transmission unit transmits control data of the printing element as the data signal, a first period is set as the predetermined period, and when the data transmission unit transmits, as the data signal, connection confirmation data for confirming connection of the printhead to the printing apparatus, a second period longer than the first period is set as the predetermined period.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted

First Embodiment

<Overview of Printing System>

Figure 1A:
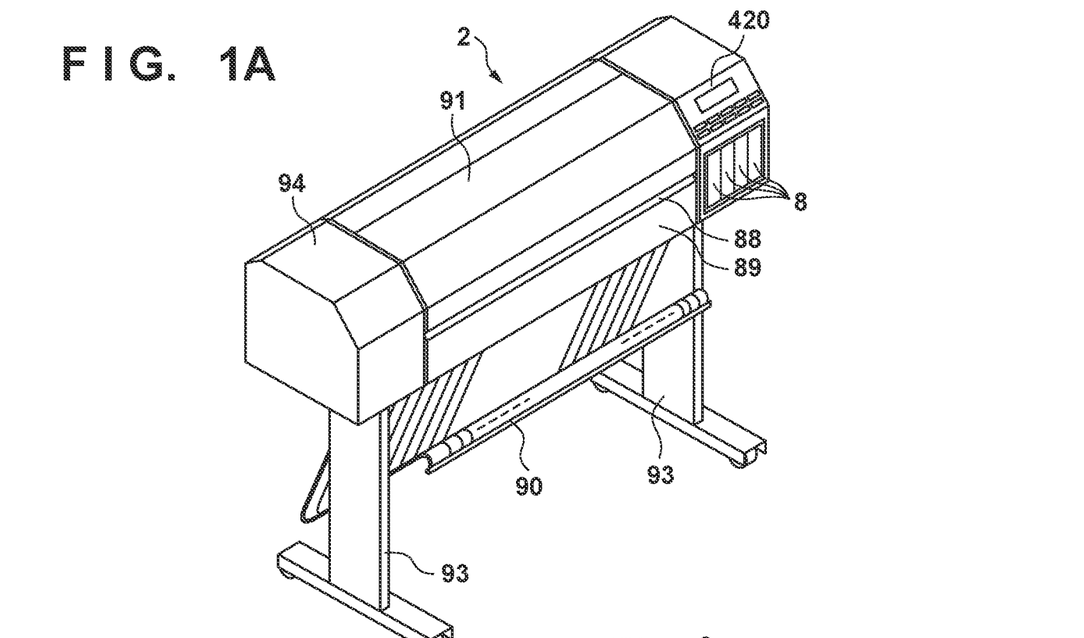
FIGS. 1A and 1B are perspective views each showing the outer appearance of a printing system according to an embodiment of the present invention.
Figure 1B:
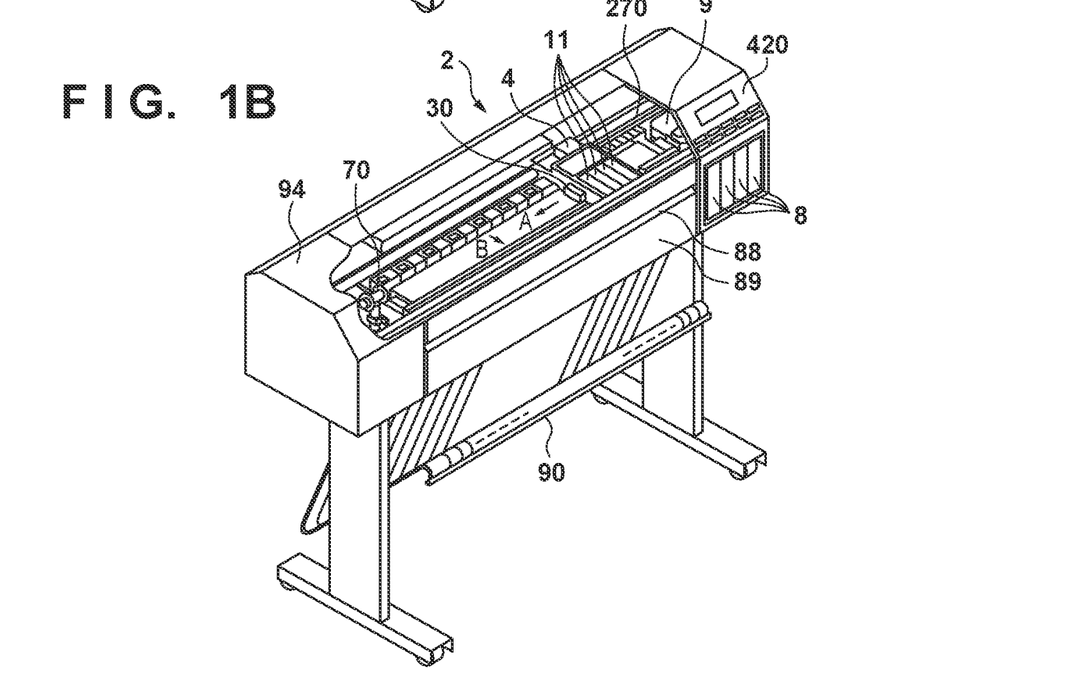

FIG. 1A is a perspective view showing the outer appearance of a printing system according to the embodiment of the present invention. FIG. 1B is a perspective view of the printing system from which an upper cover has been detached. The printing system according to this embodiment includes a printing apparatus 2 and a printhead 11. The printing system can be called a printing apparatus. In this case, the printing apparatus 2 can be called an apparatus main body.

The printing apparatus 2 is an inkjet printer, and is assumed to be a printing apparatus that uses a print medium of a relatively large size (so-called large size) like A0 size or B0 size in this embodiment. However, the present invention is also applicable to a printing apparatus that uses a print medium of a relatively small size and a printing apparatus of another form.

Note that "printing" not only includes the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans. In addition, this embodiment assumes sheet-like paper as "the print medium", but it is also possible to use, for example, a piece of cloth or a plastic film.

As shown in FIG. 1A, a manual feed port 88 is provided on the front surface of the printing apparatus 2, and a roll paper cassette 89 that can be opened/closed on the front side is provided below the manual feed port 88. A print medium (sheet) is supplied from the manual feed port 88 or the roll paper cassette 89 into the printing apparatus 2.

The printing apparatus 2 includes a housing 94 that is supported by two leg portions 93, a stacker 90 on which a discharged print medium is stacked, and a transparent openable/closable upper cover 91 through which the inside of the printing apparatus 2 can be seen. On the right side of the housing 94, an operation unit 420 and ink tanks 8 are arranged.

As shown in FIG. 1B, the printing apparatus 2 includes a conveyance roller 70 for conveying the print medium in the direction (a sub-scanning direction) of an arrow B, and a carriage 4 that is supported to be reciprocally movable in the widthwise direction (the direction of an arrow A or a main scanning direction) of the print medium. A conveyance roller 80 forms a conveyance mechanism together with a motor and a deceleration mechanism (neither of which is shown), and conveys the print medium by the rotation of the conveyance roller 80.

The carriage 4 is connected to an endless carriage belt 270. The carriage belt 270 forms a belt transmission mechanism together with a carriage motor or a pulley (neither of which is shown). The carriage 4 moves when the carriage belt 270 travels. The position of the carriage 4 is detected by a sensor (not shown). In the carriage 4, a plurality of printheads 11 and a sensor unit 30 are provided.

In this embodiment, color printing can be performed on the print medium. Therefore, the printhead 11 formed from four heads corresponding to ink types (to be referred to as the printhead 11 hereinafter) is mounted on the carriage 4. That is, the printhead 11 is formed by, for example, a K head for discharging K (black) ink, a C head for discharging C (cyan) ink, an M head for discharging M (magenta) ink, and a Y head for discharging Y (yellow) ink. Ink is supplied from the ink tank 8. A recovery unit 9 eliminates an ink discharge failure caused by clogging of an orifice by, for example, sucking the ink orifice of the printhead 11. The printhead 11 may include units for respective ink types, or may be one unit including heads corresponding to a plurality of ink types.

In this embodiment, the printhead 11 is detachable from the carriage 4. If the performance of the printhead 11 decreases, the printhead 11 can be replaced. That is, the old printhead 11 can be detached from the carriage 4 and the new printhead 11 can be attached to the carriage 4.

The sensor unit 30 is a unit that can read an image printed on the print medium. The sensor unit 30 is, for example, a reflection type optical sensor, and detects the density of an image (for example, a pattern) formed on the print medium, thereby reading the image. By combining conveyance of the print medium in the sub-scanning direction and movement of the carriage 4 in the main scanning direction, the sensor unit 30 can read an image at an arbitrary position on the print medium. The sensor unit 30 can be used to detect the edge portion of the print medium or determine the type of the print medium.

If an image is printed on the print medium with the above arrangement, the print medium is conveyed, by the conveyance roller 70, to a predetermined printing start position. After that, an operation of discharging ink while making the printhead 11 scan in the main scanning direction by the carriage 4 and an operation of conveying the print medium in the sub-scanning direction by the conveyance roller 70 are repeated, thereby printing an image over the print medium.

That is, when the carriage 4 moves, by the belt 270 and the carriage motor (not shown), in the direction of the arrow A shown in FIG. 1B, printing is executed on the print medium. If the carriage 4 is returned to a position (home position) before scanning, the print medium is conveyed in the sub-scanning direction (the direction of the arrow B shown in FIG. 1B) by the conveyance roller 80, and then, the carriage 4 is scanned again in the direction of the arrow A in FIG. 1B. In this way, the image and characters are printed on the print medium. If the above operations are further repeated to end printing of one print medium, the print medium is discharged to the stacker 90, thereby completing printing of one print medium. As described above, the printing apparatus 2 of this embodiment is a serial type inkjet printer for executing printing by scanning the printhead 11 but the present invention is also applicable to a printing apparatus including a full line head.

<Arrangement of Control System>

Figure 2:
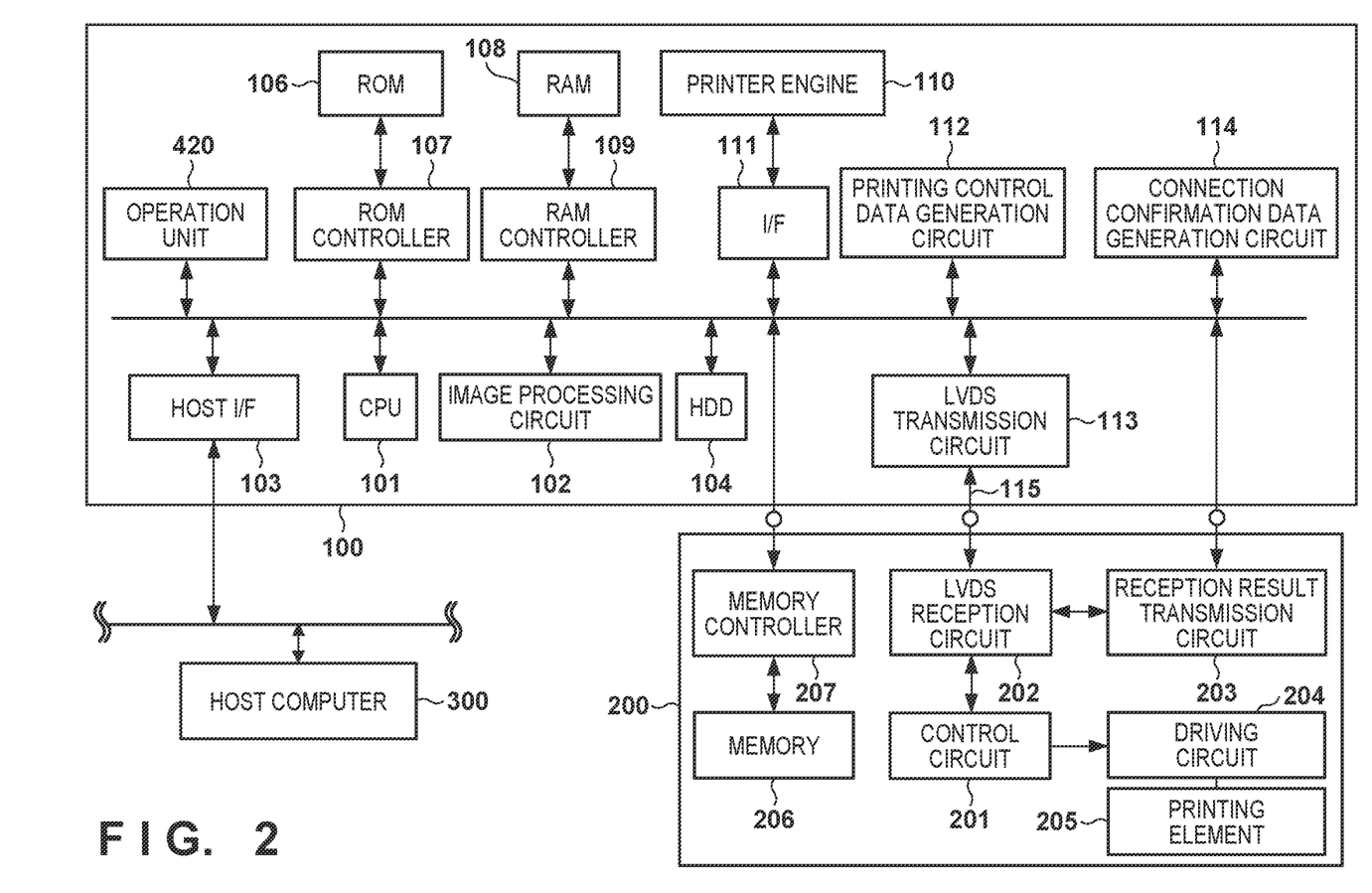
FIG. 2 is a block diagram of a control system of the printing system shown in FIGS. 1A and 1B.

FIG. 2 is a block diagram of the control system of the printing system according to this embodiment. The printing apparatus 2 is provided with a control unit 100 and the printhead 11 incorporates a head circuit 200.

The control unit 100 has the following arrangement. A CPU 101 controls the overall printing apparatus 2. The CPU 101 controls the operation of the overall printing apparatus 2 by executing an operation control program stored in a ROM 106. The operation unit 420 is, for example, a touch panel, and the CPU 101 performs input detection and display control of the touch panel.

A host I/F (interface) 103 connects the printing apparatus 2 and a host computer 300, and transmits/receives data between them. Print job data received from the host computer 300 via the host interface 103 is stored in the RAM 108. The host interface 103 performs communication by, for example, a serial communication method such as USB or a network communication method such as 1000 Base-TX.

A RAM 108 is connected to a system bus via a RAM controller 109 that manages access control. The RAM 108 functions as a work memory when executing the operation control program executed by the CPU 101. The RAM 108 also functions as a buffer memory for storing print job data and various kinds of intermediate data generated during execution of print processing.

The ROM 106 is connected to the system bus via a ROM controller that manages access control. The ROM 106 is a memory that stores the operation control program executed by the CPU 101, various kinds of data for printing control, various kinds of screen data to be displayed on the operation unit 420, and the like. The operation control program includes a program for controlling a printer engine 208 and a connection inspection program. The connection inspection program is a program for determining whether the printhead 11 has normally been attached to the printing apparatus 2, and an example of the processing will be described later.

An HDD 104 functions as a mass storage device of the printing apparatus 2, and can be used to, for example, save print job data received from the host computer 300.

An image processing circuit 102 converts print job data received from the host computer 300 into image data to be output to the print medium, and then saves the converted data in the RAM 108. For example, color space conversion processing, gamma correction processing, quantization processing by an error diffusion method, or the like is performed for image data transmitted, as print job data, from the host computer 300.

A printer engine 110 includes various sensors and actuators of the printing apparatus 2 such as a motor for driving the conveyance roller 80 and a motor for moving the carriage 4. The printer engine 110 is connected to the system bus via an I/F (interface) 111, and the CPU 101 controls the operation of the printer engine 110.

A printing control data generation circuit 112 generates printing control data for causing the printhead 11 to execute an ink discharge operation. For example, the printing control data generation circuit 112 reads out image data from the RAM 108 in accordance with a discharge timing signal generated from a signal representing the position of the carriage 4. Then, data processing corresponding to the various driving types of the nozzles of the printhead 11 is performed to generate printing control data. The generated printing control data may temporarily be stored in the RAM 108. The printing control data is converted into a serial signal and transmitted from an LVDS transmission circuit 113 to the printhead 11. Together with the printing control data, heat data based on a divided pulse width modulation driving method may be transmitted. The divided pulse width modulation driving method is, for example, a method of forming a pulse to be applied to the printing element (heater) by a prepulse for preheating ink immediately above the heater and a main pulse for foaming ink instead of a single pulse.

The LVDS transmission circuit 113 is a signal transmission circuit using a differential transmission method, and transmits a differential transmission signal. A connection confirmation data generation circuit 114 generates connection confirmation data for confirming connection of the printhead 11 to the printing apparatus 2. The connection confirmation data is converted into a serial signal and transmitted from the LVDS transmission circuit 113 to the printhead 11.

The head circuit 200 has the following arrangement. Note that with respect to communication between the control unit 100 and the head circuit 200, data are transmitted/received between the LVDS transmission circuit 113 and an LVDS reception circuit 202 by the differential transmission method using an LVDS signal line 115. In other communication paths, single-ended data are transmitted/received.

The LVDS reception circuit 202 receives the signal string of the printing control data transmitted from the LVDS transmission circuit 113, and deserializes it, thereby outputting the thus obtained data to a control circuit 201. The control circuit 201 controls a driving circuit 204 based on the printing control data to drive a printing element 205. The printing element 205 is an element that is provided for each ink orifice and discharges ink by supply of power, and is particularly an electrothermal transducer (heater). The electrothermal transducer generates heat upon energization to foam ink, and discharges the ink from the ink orifice by the foaming energy. Note that instead of the electrothermal transducer, the printing element 205 may be another printing element such as a piezoelectric element.

A reception result transmission circuit 203 is an information transmission circuit that transmits, to the control unit 100, information concerning a result of receiving the signal string by the LVDS reception circuit 202. More specifically, the reception result transmission circuit 203 is a signal array determination circuit that monitors the signal string received by the LVDS reception circuit 202 and transmits, to the control unit 100, information indicating whether the signal string includes an error.

A memory 206 is a nonvolatile memory that stores individual information of the printhead 11 and the like, and is, for example, a ROM. The memory 206 is connected to the control unit 100 via a memory controller that manages access control, and the CPU 101 can acquire the information stored in the memory 206.

<LVDS Signal Line>

Figure 3A:
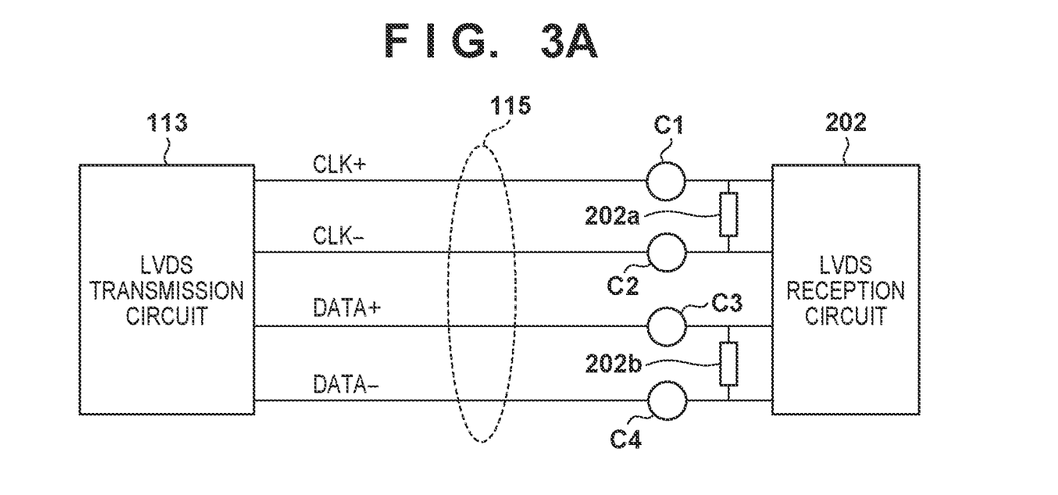
FIG. 3A is an explanatory view of a signal line between an LVDS transmission circuit and an LVDS reception circuit.

FIG. 3A is an explanatory view of the LVDS signal line 115. The LVDS signal line 115 includes a signal line for a CLK+ signal, a signal line for a CLK− signal, a signal line for a DATA+ signal, and a signal line for a DATA− signal. The CLK+ signal and the CLK− signal are clock signals having a positive/negative inversion relationship. The DATA+ signal and the DATA− signal are data signals having a positive/negative inversion relationship. Contacts C1 to C4 exist on the signal lines, respectively. If the printhead 11 is attached to the carriage 4, the signal lines are electrically connected at the contacts C1 to C4, respectively. A terminating resistor 202a is connected between the signal line for the CLK+ signal and the signal line for the CLK− signal. A terminating resistor 202b is connected between the signal line for the DATA+ signal and the signal line for the DATA− signal. The resistance values of the terminating resistors 202a and 202b are, for example, 100Ω.

<Inspection of Connection Failure>

Figure 3B:
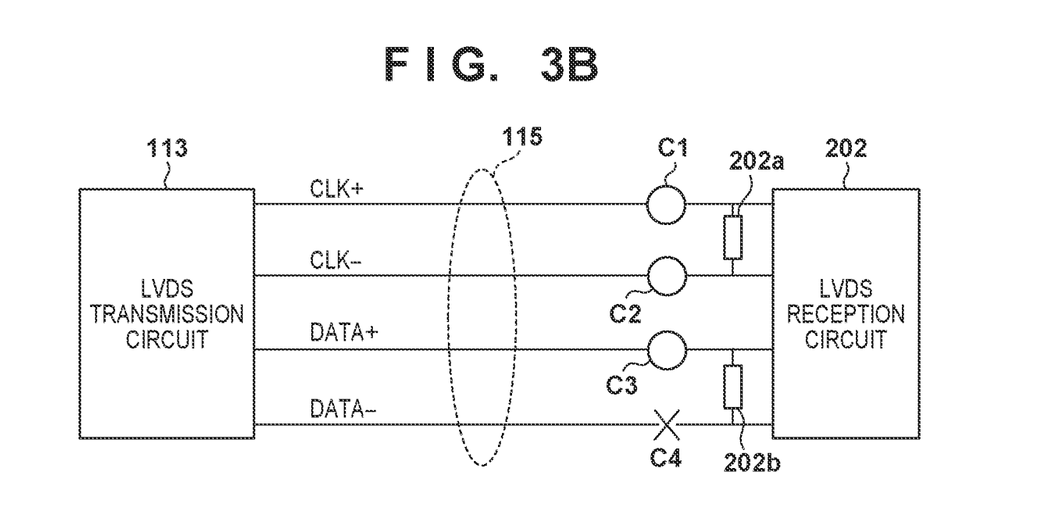
FIG. 3B is an explanatory view showing an example of a wiring failure of the signal line.

If a contact failure occurs because, for example, foreign matter is caught in each of the contacts C1 to C4, this interferes with data transmission from the control unit 100 to the printhead 11. For example, as shown in FIG. 3B, electrical connection at the contact C4 is interrupted. Inspection concerning a failure of connection of the printhead 11 to the printing apparatus 2 will be described below.

Figure 4A:
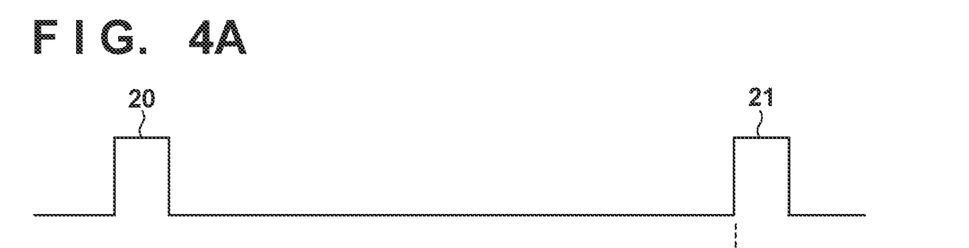
FIG. 4A is an explanatory view of a trigger signal.

FIGS. 4A to 4E are explanatory views of the operation of the reception result transmission circuit 203. FIG. 4A shows an example of a trigger signal transmitted from the LVDS transmission circuit 113. A period from a trigger signal 21 to a next trigger signal 22 is a unit of a determination period.

Figure 4B:
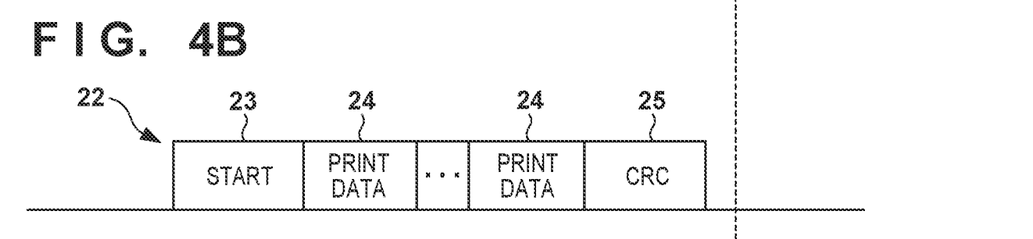
FIG. 4B is a view showing an example of the structure of the signal string of printing control data.
Figure 4C:
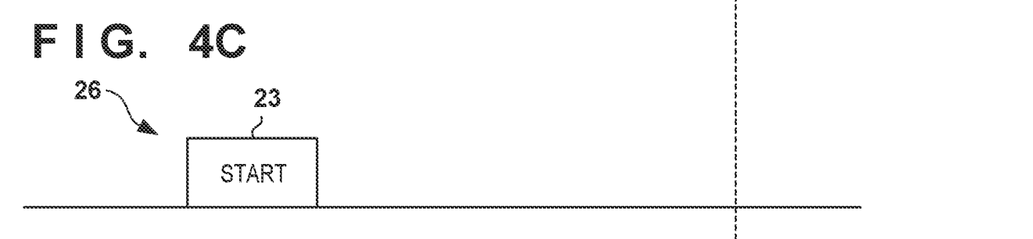
FIG. 4C is a view showing an example of the structure of the signal string of connection confirmation data.

FIG. 4B shows the structure (data format) of the signal string of printing control data. The printing control data is formed from signal strings of a start command 23, a plurality of print data 24, and a CRC command 25. The start command 23 is a signal string indicating the transmission start, and the print data 24 is a signal string corresponding to the entity of the control data of the printing element 205. FIG. 4C shows the structure of the signal string of connection confirmation data. This embodiment adopts a method in which the reception result transmission circuit 203 need not recognize, in advance, whether the signal string received by the LVDS reception circuit 202 is printing control signal or connection confirmation data. The connection confirmation data includes only the start command 23 in the printing control data.

Figure 4D:
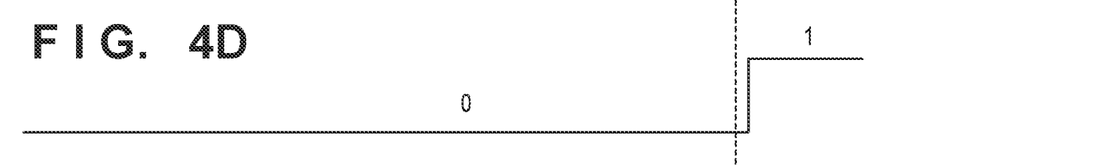
FIG. 4D is a view showing an example of information indicating a connection determination result (normal)

If connection of the printhead 11 to the printing apparatus 2 is normal, the printhead 11 expects the print data 24 and the CRC command 25 following the start command 23. However, if the connection confirmation data is received, the CRC command 25 does not come between the trigger signal 21 and the next trigger signal 22. In this case, the reception result transmission circuit 203 sets a reception error flag to "1", as shown in FIG. 4D. The predetermined value (at the time of normal reception) of the reception error flag is "0", and "1" indicates that the received signal string includes an error.

Figure 4E:
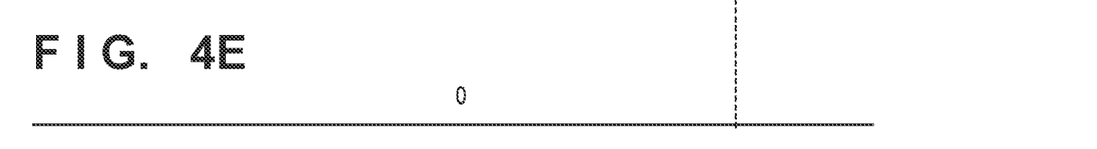
FIG. 4E is a view showing an example of information indicating a connection determination result (failure)

At the time of connection confirmation processing of the printhead 11, the CPU 101 acquires the value of the reception error flag from the reception result transmission circuit 203. If the acquired value is "1", the CPU 101 determines that the printhead 11 has appropriately been attached to the printing apparatus 2. This is because the connection confirmation data includes only the start command 23 without including the CRC command 25, and a reception error is always determined if the connection confirmation data is appropriately transmitted to the printhead 11. To the contrary, at the time of the connection confirmation processing of the printhead 11, if the reception error flag is "0", as shown in FIG. 4E, a connection failure of the printhead 11 can be determined. Note that if a plurality of printheads 11 of different ink types are attached to the printing apparatus 2, connection failure inspection is performed for each printhead 11.

Figure 5:
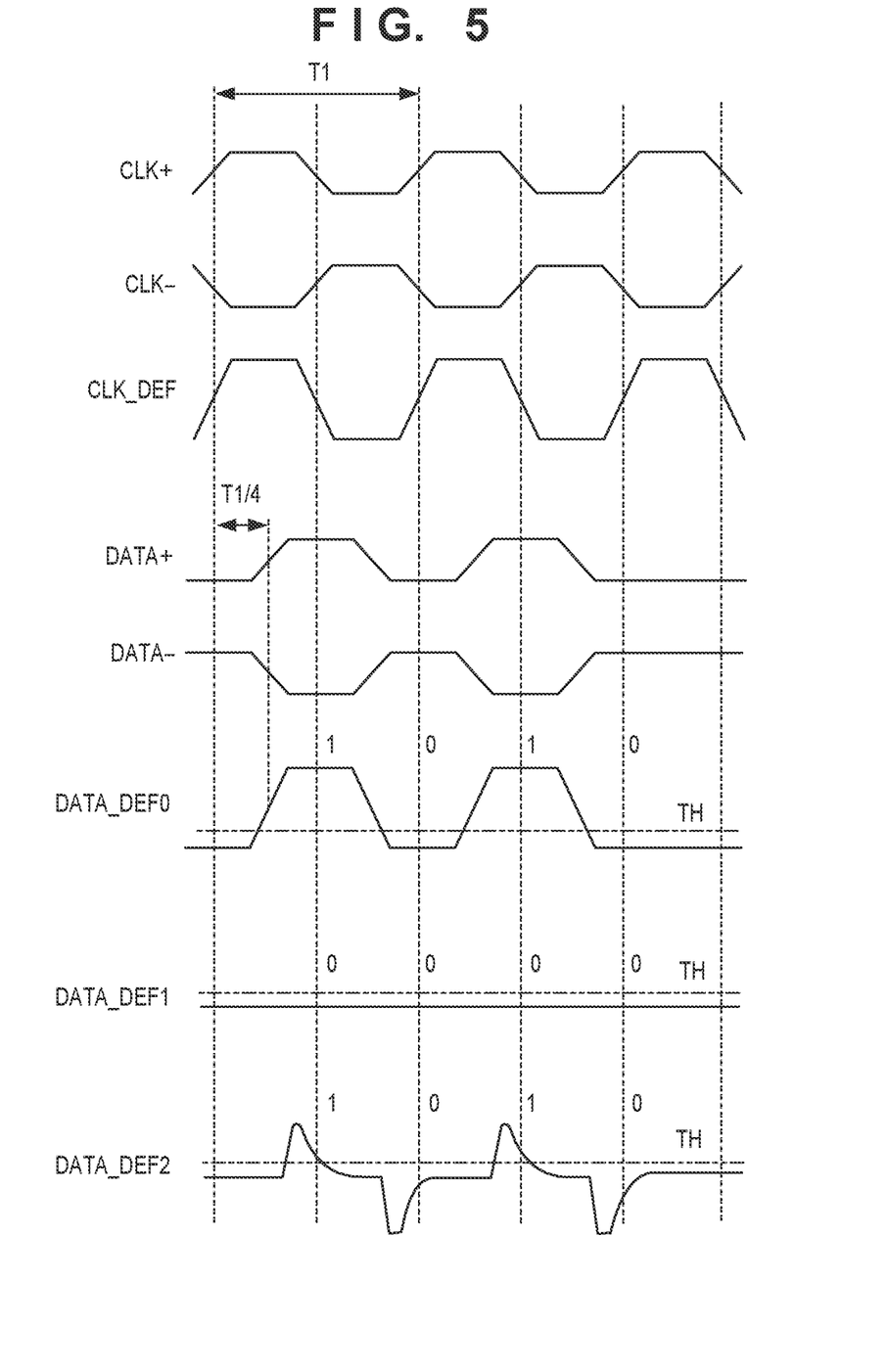
FIG. 5 is a timing chart showing examples of signals with reference to a period (frequency) at the time of transmitting the printing control data.

With this mechanism, a connection failure of the printhead 11 can be inspected. However, if the frequency of the clock signal is high (the period is short), erroneous determination may occur due to the influence of a time constant on the LVDS signal line 115. In particular, the differential transmission method has a merit in data transmission at a high frequency, and it is possible to transmit the printing control data from the control unit 100 to the printhead 11 at a higher speed. Thus, the data may be influenced by the time constant. FIG. 5 is an explanatory view in this case.

Referring to FIG. 5, CLK_DEF is a voltage difference between the CLK+ signal and the CLK− signal, both of which are transmitted from the LVDS transmission circuit 113, and is a clock signal of a period T1. The period T1 is the transmission period of the printing control data. DATA_DEF0 is a voltage difference between the DATA+ signal and the DATA− signal transmitted from the LVDS transmission circuit 113, and is a data signal.

The data signal is a signal synchronized with the clock signal, and is delayed by ¼ period with respect to the clock signal. The delay signal may be generated by the LVDS transmission circuit 113 as the transmission source or by the LVDS reception circuit 202. It is possible to convert the received data signal string into digital data by latching the data signal (DATA_DEF0) at the rising edge and falling edge of the clock signal (CLK_DEF), and comparing the voltage value of the signal with a voltage threshold TH. FIG. 5 shows an example in which "1010" is obtained as data represented by the data signal (DATA_DEF0).

Assume that a contact failure has occurred at the contact C4, as exemplified in FIG. 3B. Under the condition that there is no parasitic capacitance in the head circuit 200 and the time constant is 0, the potential of the terminating resistor 202b is equipotential, and the data signal obtained on the side of the LVDS reception circuit 202 is "0000", as indicated by DATA_DEF1.

If, in the example shown in FIG. 4C, the start command is "1010", the start command is recognized in the case of DATA_DEF0 in FIG. 5. After that, no CRC command is received, and thus the reception result transmission circuit 203 sets the reception error flag to "1". As a result, upon acquiring the reception error flag, the CPU 101 determines that connection of the printhead 11 is normal. In the case of DATA_DEF1 in FIG. 5, the start command is not recognized, and thus the reception error flag remains to be the predetermined value "0". As a result, upon receiving the reception error flag, the CPU 101 determines that connection of the printhead 11 fails.

On the other hand, in fact, if there exists a time constant due to a parasitic capacitance in the head circuit 200, the resistance of the signal line, or the like, and the time constant is equal to or larger than a predetermined value, the data signal is influenced by the time constant. If, as exemplified in FIG. 3B, a contact failure has occurred at the contact C4, a voltage difference may be generated, as indicated by DATA_DEF2, unlike DATA_DEF1 in FIG. 5, thereby obtaining data of "1010". If the start command is "1010", the start command is recognized in the case of DATA_DEF2 in FIG. 5. After that, no CRC command is received, and thus the reception result transmission circuit 203 sets the reception error flag to "1". As a result, upon acquiring the reception error flag, the CPU 101 erroneously determines that connection of the printhead 11 is normal.

Figure 6:
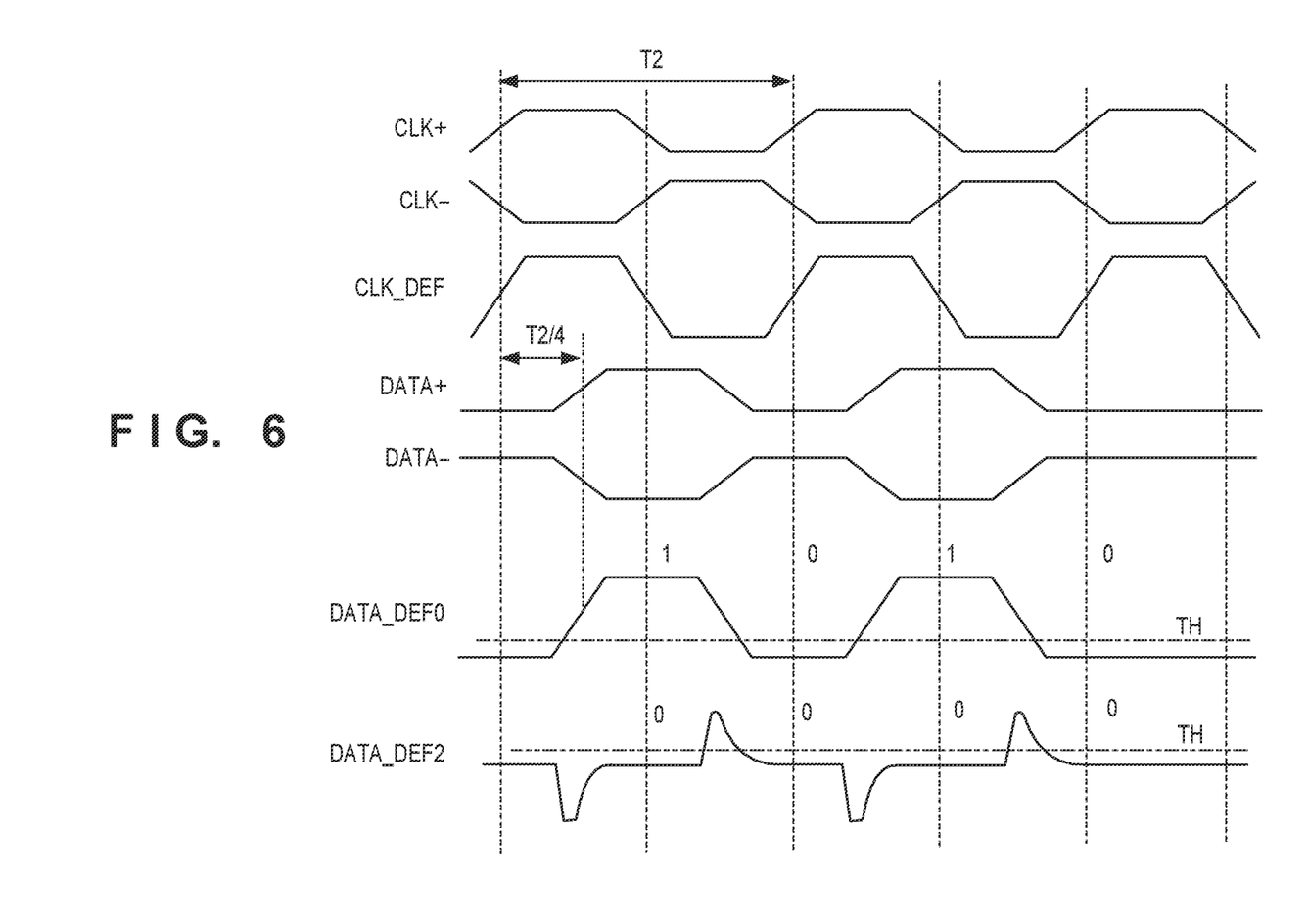
FIG. 6 is a timing chart showing examples of signals with reference to a period (frequency) in consideration of a time constant.

To cope with this, in this embodiment, at the time of the connection confirmation processing of the printhead 11, the period T1 is replaced by a period T2 longer than the period T1. This can prevent erroneous determination caused by the time constant. FIG. 6 shows an example.

Similar to the example shown in FIG. 5, CLK_DEF is a voltage difference between the CLK+ signal and the CLK− signal, both of which are transmitted from the LVDS transmission circuit 113, and is a clock signal. However, the period T2 is longer than period T1.

The period T2 is set to, for example, a time equal to or longer than a time obtained by adding, to the period T1, a time constant obtained by an experiment or the like. If, for example, the period T1 at the time of transmitting the printing control data is 1.0 nsec (frequency: 1 GHz) and the time constant on the signal line is 0.5 nsec, the period T2 is 2 nsec (frequency: 500 MHz). If this is expressed by an equation, for example, T2=T1+time constant+coefficient, T2=T1+time constant×coefficient (>1), or T2=(T1+time constant)×coefficient (>1) is used.

Similar to the example shown in FIG. 5, DATA_DEF0 is a data signal as a voltage difference between the DATA+ signal and the DATA− signal, and is delayed by ¼ period with respect to the clock signal. Then, similar to the example shown in FIG. 5, the received data signal string is converted into digital data "1010" by latching the data signal (DATA_DEF0) at the rising edge and falling edge of the clock signal (CLK_DEF), and comparing the voltage value of the signal with the voltage threshold TH.

Similar to the example shown in FIG. 5, DATA_DEF2 shows an example in which a contact failure occurs at the contact C4, as exemplified in FIG. 3B, and the data signal is influenced by the time constant. However, by making the period T2 longer, a timing at which the voltage changes is shifted from the timing of comparison with the voltage threshold TH (the rising edge or falling edge of the clock signal). As a result, the obtained data is "0000", and the reception error flag remains to be the predetermined value "0", similar to the example of DATA_DEF1 in FIG. 5. Thus, upon receiving the reception error flag, the CPU 101 determines that connection of the printhead 11 fails. In this embodiment, therefore, it is possible to improve the inspection accuracy of a connection failure of the printhead 11.

Processing Example

Figure 7A:
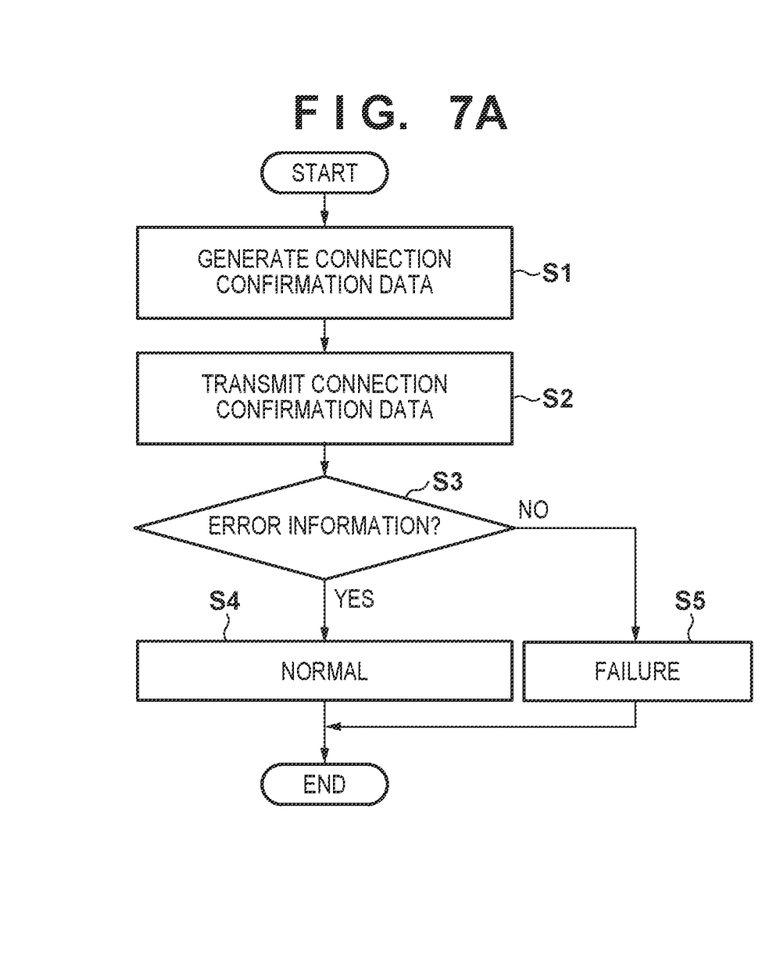
FIGS. 7A and 7B are flowcharts each showing an example of the processing of a control unit of the printing apparatus.

An example of connection inspection processing of the printhead 11 executed by the CPU 101 will be described. FIG. 7A is a flowchart illustrating an example. The processing shown in FIG. 7A is executed, for example, when the printing apparatus 2 is powered on or when a notification that the user has performed an operation of replacing the printhead 11 via the operation unit 420 is made.

In step S1, the CPU 101 causes the connection confirmation data generation circuit 114 to generate connection confirmation data. With respect to the example shown in FIG. 6, the connection confirmation data generation circuit 114 generates data including "1010" as a start command without including the CRC command In step S2, the CPU 101 causes the LVDS transmission circuit 113 to transmit, to the printhead 11, by the differential voltage method, the connection confirmation data generated by the connection confirmation data generation circuit 114. At this time, the CPU 101 sets (instructs), in the LVDS transmission circuit 113, as the period of the clock signal, not the period T1 at the time of transmitting the printing control data but the period T2 for transmission of the connection confirmation data. A known technique is used to switch the signal period. In the head circuit 200 of the printhead 11, the LVDS reception circuit 202 receives the connection confirmation data, and the reception result transmission circuit 203 sets the reception error flag to "1" or "0" based on the received data.

In step S3, the CPU acquires the reception error flag from the reception result transmission circuit 203, and determines whether the acquired reception error flag indicates error information ("1"). If the reception error flag indicates error information, the process advances to step S4, and the CPU sets, as the setting of the state of the printing apparatus 2, that the printhead 11 has normally been connected. If the reception error flag indicates no error information, the process advances to step S5, and the CPU sets, as the setting of the state of the printing apparatus 2, that a connection failure of the printhead 11 has occurred. If it is set that a connection failure has occurred, handling processing such as notification to the user is executed.

Second Embodiment

In the first embodiment, the period T2 is uniformly set regardless of the individual difference of the printhead 11, but may be set for each printhead 11. The time constant changes depending on the individual difference of the printhead 11. By setting the period T2 for each printhead 11, it is possible to shorten the inspection time with respect to the printhead 11 with a small time constant.

Each of the time constants of the printheads 11 can be measured by an experiment at the time of shipment or the like. For example, the printing apparatus 2 for measuring the time constant is prepared in advance. The printhead 11 is attached to the prepared printing apparatus 2, and data communication is performed using the LVDS signal line 115 between the printing apparatus 2 and the printhead 11. At this time, a time (time constant) required for the signal transmitted from the printing apparatus 2 to the printhead 11 to rise is actually measured using a measuring device. After that, the measured time constant is written and stored, as time constant information unique to the printhead 11, in the memory 206 of the head circuit 200. This makes it possible to read out the time constant information from the memory 206 by an arbitrary printing apparatus 2 after the printhead 11 is distributed.

Figure 7B:
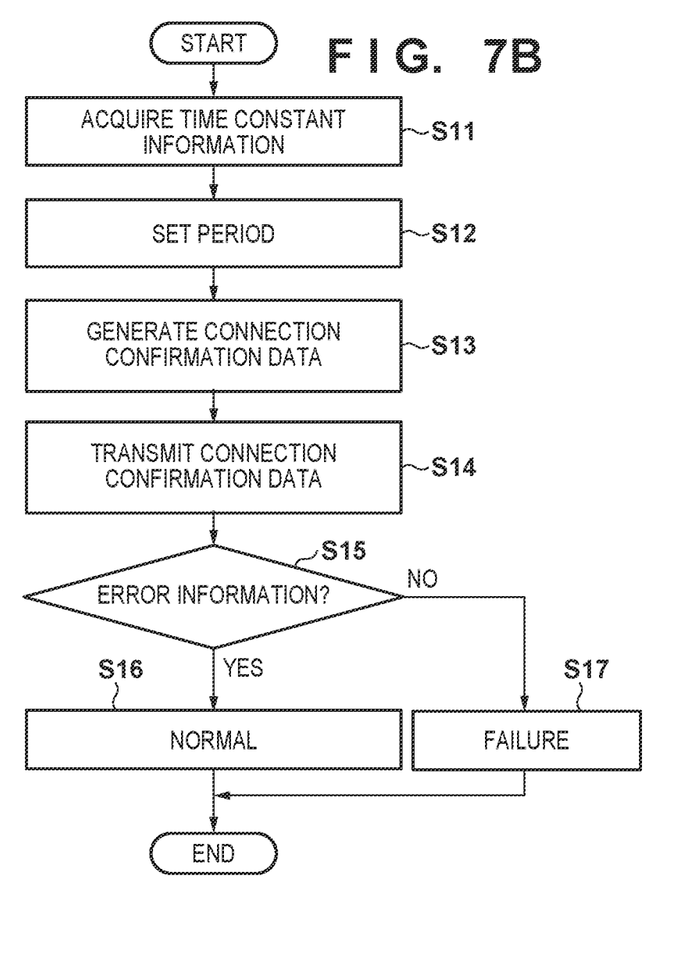

In this embodiment, an example of connection inspection processing of a printhead 11 executed by a CPU 101 will be described. FIG. 7B is a flowchart illustrating an example. The processing shown in FIG. 7B is executed, for example, when a printing apparatus 2 is powered on or when a notification that the user has performed an operation of replacing the printhead 11 via an operation unit 420 is made.

In step S11, the CPU 101 acquires (reads out) time constant information from a memory 206 of the printhead 11. If the time constant information cannot be acquired, the CPU 101 can determine a connection failure of the printhead 11 at this timing. In step S12, a period T2 is set based on the time constant information acquired in step S11. An example of a method of setting the period T2 in consideration of the time constant is as described in the first embodiment.

Processes in steps S13 to S17 are the same as those in steps S1 to S5 of FIG. 5A, respectively. In step S13, the CPU 101 causes a connection confirmation data generation circuit 114 to generate connection confirmation data. In step S14, the CPU 101 causes an LVDS transmission circuit 113 to transmit, to the printhead 11, by the differential voltage method, the connection confirmation data generated by the connection confirmation data generation circuit 114. At this time, the CPU 101 sets (instructs), in the LVDS transmission circuit 113, as the period of the clock signal, the period T2 set in step S12. In a head circuit 200 of the printhead 11, an LVDS reception circuit 202 receives the connection confirmation data, and a reception result transmission circuit 203 sets a reception error flag to "1" or "0" based on the received data.

In step S15, the CPU acquires the reception error flag from the reception result transmission circuit 203, and determines whether the acquired reception error flag indicates error information ("1"). If the reception error flag indicates error information, the process advances to step S16, and the CPU sets, as the setting of the state of the printing apparatus 2, that the printhead 11 has normally been connected. If the reception error flag indicates no error information, the process advances to step S17, and the CPU sets, as the setting of the state of the printing apparatus 2, that a connection failure of the printhead 11 has occurred. If it is set that a connection failure has occurred, corresponding processing such as notification to the user is executed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-201989, filed Dec. 13, 2021, which is hereby incorporated by reference herein in its entirety.

What is claimed is:

1. A printing system comprising:
a printing apparatus; and
a printhead including a printing element and configured to be detachable from the printing apparatus,
the printing apparatus including:
   a data transmission unit configured to transmit, to the printhead, a clock signal of a predetermined period and a data signal synchronized with the clock signal, and
the printhead including:
   a reception unit configured to receive the clock signal and the data signal, and
   an information transmission unit configured to transmit, to the printing apparatus, information concerning a reception result of the reception unit,
wherein when the data transmission unit transmits control data of the printing element as the data signal, a first period is set as the predetermined period, and
when the data transmission unit transmits, as the data signal, connection confirmation data for confirming connection of the printhead to the printing apparatus, a second period longer than the first period is set as the predetermined period.

2. The system according to claim 1, wherein the data transmission unit transmits differential transmission signals as the clock signal and the data signal.

3. The system according to claim 1, wherein the second period is a time not shorter than a time obtained by adding a time constant of the data signal to the first period.

4. The system according to claim 3, wherein
the printhead includes a storage unit configured to store time constant information representing the time constant, and
the printing apparatus further includes:
   an acquisition unit configured to acquire the time constant information from the storage unit, and
   a setting unit configured to set the second period based on the time constant information acquired by the acquisition unit.

5. The system according to claim 1, wherein
the data signal concerning the control data includes a first signal string indicating a transmission start and a second signal string concerning driving of the printing element, and
the connection confirmation data includes the first signal string without including the second signal string.

6. The system according to claim 5, wherein
when the data signal received from the reception unit includes the first signal string without including the second signal string, the information transmission unit transmits information indicating an error to the printing apparatus.

7. A printing apparatus from which a printhead including a printing element is detachable, comprising:
a data transmission unit configured to transmit, to the printhead, a clock signal of a predetermined period and a data signal synchronized with the clock signal,
wherein when the data transmission unit transmits control data of the printing element as the data signal, a first period is set as the predetermined period, and
when the data transmission unit transmits, as the data signal, connection confirmation data for confirming connection of the printhead to the printing apparatus, a second period longer than the first period is set as the predetermined period.

* * * * *